C. H. Robinson,
Hay Press,
Nº 39,588. Patented Aug. 18, 1863.
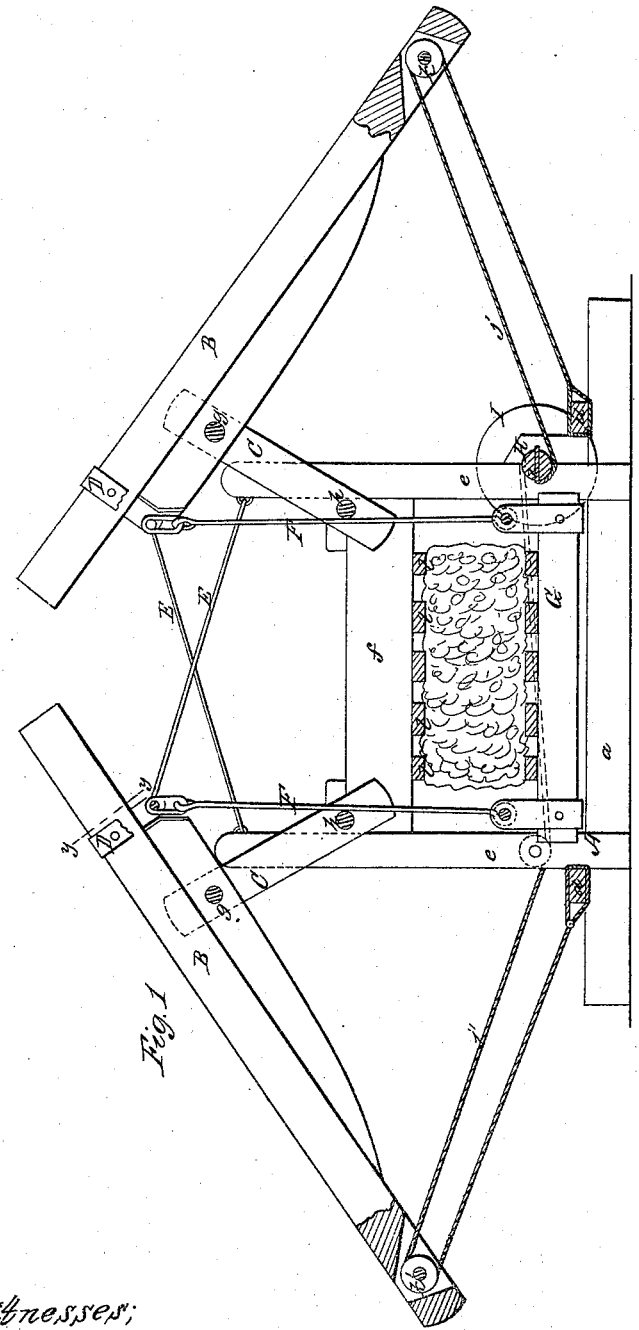
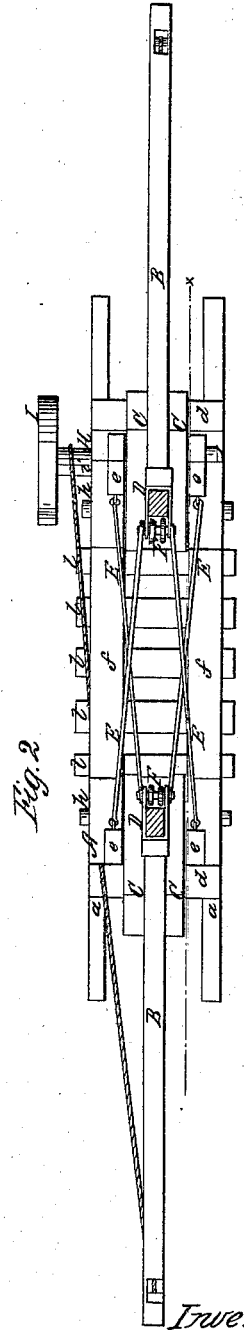
Witnesses:
J. W. Coombs
Geo. Reed
Inventor,
Charles H. Robinson
per Munn & Co.

UNITED STATES PATENT OFFICE.

CHAS. H. ROBINSON, OF BATH, MAINE.

IMPROVEMENT IN HAY AND COTTON PRESSES.

Specification forming part of Letters Patent No. 39,588, dated August 18, 1863.

*To all whom it may concern:*

Be it known that I, CHARLES H. ROBINSON, of Bath, in the county of Sagadahoc and State of Maine, have invented a new and Improved Press for Compressing Hay, Cotton, and other Substances for Bailing; and I do hereby declare that the following is a full, clear, and exact description of the same, reference being had to the accompanying drawings, making a part of this specification, in which—

Figure 1 is a longitudinal vertical section of my invention, taken in the line *x x*, Fig. 2; Fig. 2, a plan or top view of the same with the upper ends of the levers cut off, as indicated by the line *y y*, Fig. 1.

Similar letters of reference indicate corresponding parts in the two figures.

The object of this invention is to obtain a simple, efficient, and portable or compact press for compressing hay, cotton, and other substances for baling by means of animal or other power.

The invention consists in a novel arrangement of levers, connecting-rods, and fulcrum-rods combined with a follower in such manner that the desired end is attained.

To enable those skilled in the art to fully understand and construct my invention, I will proceed to describe it.

A represents the framing of the press, which is composed of two parallel sill-pieces, *a a*, connected by cross-bars *d d*, the sill-pieces having each two uprights, *e e*, attached to them, the uprights of each sill-piece having a horizontal bar, *f*, secured to them near their upper ends.

B B represent two levers which are connected by rods *g*, each to two bars, C C, the lower ends of which are fitted loosely on rods *h h* on the bars *f*, near their ends. The levers B and bars C form toggles, of which the levers B are much the longer arms. The levers B, near their upper ends, have each a metallic strap, D, fitted on them, and to the lower end of each of these straps two rods, E E, are attached at one end, the opposite ends of said rods being permanently secured to the upper ends of the two uprights *e e*, which are at the opposite end of the framing A.

To the lower end of each strap D there are also attached two rods, F F, the lower ends of which are attached to the ends of a follower, G, which is fitted between the two uprights *e e* at each end of the framing, and is allowed to rise and fall freely.

H is a windlass, which is secured to the lower parts of two of the uprights *e e* at one end of the framing A, and has a pulley, I, at one end of its drum *i*. This drum *i* has one end of a rope, *j*, attached to it, said rope passing around a pulley, *k*, in the lower end of one of the levers B, the opposite end of the rope *j* being attached to the cross-bar *d* of the framing just below the windlass H. To the pulley I there is also attached one end of a rope, *j'*, which passes around a pulley, *k'*, in the lower end of the other lever B, and has its opposite end attached to the other cross-bar *d* of the framing. By this arrangement it will be seen that when the windlass H is turned so that the ropes *j' j'* will be wound upon the drum *i* the lower ends of the levers B B will be drawn toward each other, and the upper ends of said levers will be moved outward from each other, the rods F raising the follower G, and causing the hay, cotton, or other substance to be compressed between the follower and slats *l*, which are attached to the under sides of the horizontal bars *f f*. Thus a very powerful leverage is obtained. The rods E serve as stays for the levers B B, and render the press very strong and firm, and also prevent the lever froms falling backward and assist in opening the press—that is to say, forcing down the follower after the bale is compressed.

Lever-presses have been arranged to work on the toggle principle; but so far as I am aware they have been constructed on a different plan from mine and more complicated and expensive to construct, the parts not being arranged in such a manner as to admit of the press being light and durable.

I do not claim, broadly, the employment or use of levers applied to a press so as to be operated by means of a windlass; but,

Having thus described my invention, what I do claim as new, and desire to secure by Letters Patent, is—

The levers B B and bars C, connected together, as shown, in combination with the follower G, rods E F, and windlass H, all being arranged and applied to the framing A, to operate as and for the purpose herein set forth.

CHAS. H. ROBINSON.

Witnesses:
JAMES HONDLETTE, Jr.,
J. D. ROBINSON.